US012720602B2

(12) United States Patent
Li

(10) Patent No.: US 12,720,602 B2
(45) Date of Patent: Aug. 25, 2026

(54) METHOD FOR REPORTING TERMINAL CAPABILITY INFORMATION, AND COMMUNICATION DEVICE

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 320 days.

(21) Appl. No.: 18/287,541

(22) PCT Filed: Apr. 23, 2021

(86) PCT No.: PCT/CN2021/089359

§ 371 (c)(1),
(2) Date: Oct. 19, 2023

(87) PCT Pub. No.: WO2022/222145

PCT Pub. Date: Oct. 27, 2022

(65) Prior Publication Data

US 2024/0389153 A1 Nov. 21, 2024

(51) Int. Cl.
*H04W 74/0833* (2024.01)
*H04W 8/24* (2009.01)

(52) U.S. Cl.
CPC ......... *H04W 74/0833* (2013.01); *H04W 8/24* (2013.01)

(58) Field of Classification Search
CPC ..... H04W 74/0833; H04W 8/24; Y02D 30/70
See application file for complete search history.

(56) References Cited

U.S. PATENT DOCUMENTS

2020/0383137 A1 12/2020 Song et al.
2023/0038753 A1* 2/2023 Tan ................... H04W 74/0833
2023/0262724 A1* 8/2023 Liu ....................... H04W 48/12 370/329
2023/0344493 A1* 10/2023 He ........................ H04W 72/25
2023/0371062 A1* 11/2023 He ...................... H04W 74/006
2024/0187843 A1* 6/2024 Lyazidi ................... H04W 8/24
2024/0244420 A1* 7/2024 Zhuang ................... H04W 8/24

FOREIGN PATENT DOCUMENTS

CN 110831184 A 2/2020
WO WO 2021010786 A1 1/2021

OTHER PUBLICATIONS

PCT/CN2021/089359, International Search Report dated Jan. 19, 2022, 2 pages.
European Patent Application No. 21937374.3, Search and Opinion dated Jun. 3, 2024, 13 pages.
Ericsson "Tp for UE identification and access restriction" 3GPP Tsg-Ran WG2 #113-e, Tdoc R2-2100985, Jan-Feb. 2021, 19 pages.

* cited by examiner

*Primary Examiner* — Phirin Sam
*Assistant Examiner* — Mang Boi Thawng
(74) *Attorney, Agent, or Firm* — Cozen O'Connor

(57) ABSTRACT

A method for reporting terminal capability information, performed by a terminal, includes: sending the terminal capability information to a base station in a random access procedure; in which the terminal capability information is configured to indicate a terminal capability supported by the terminal.

16 Claims, 10 Drawing Sheets terminal base station step 41, sending a random access message to a base station based on a PRACH resource; wherein the PRACH resource is determined according to a terminal type of the terminal and the terminal type is configured to indicate a terminal capability supported by the terminal base station core network device step 131, receiving the terminal capability information sent by a base station; wherein the terminal capability information is configured to indicate a terminal capability supported by a terminal and the terminal capability information is information acquired in a random access procedure

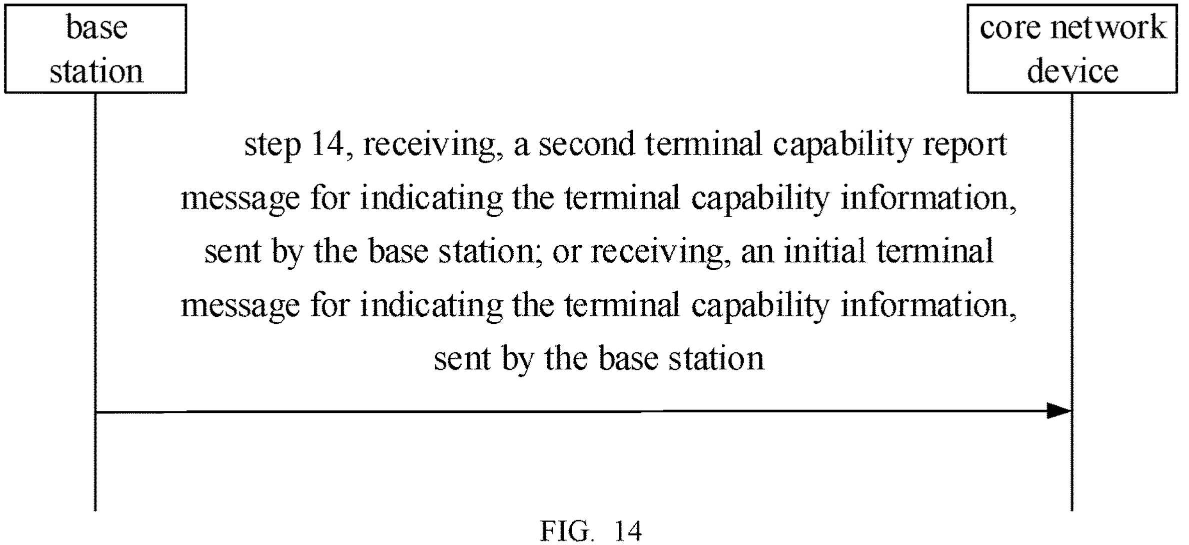

FIG. 14 base station core network device step 15, receiving a third terminal capability report message sent by the base station based on a first terminal capability report message; wherein the third terminal capability report message comprises a first field and a second field, the first field is configured to indicate the terminal capability information reported based on the first terminal capability report message, and the second field is configured to indicate the terminal capability information reported based on a random access message

FIG. 15

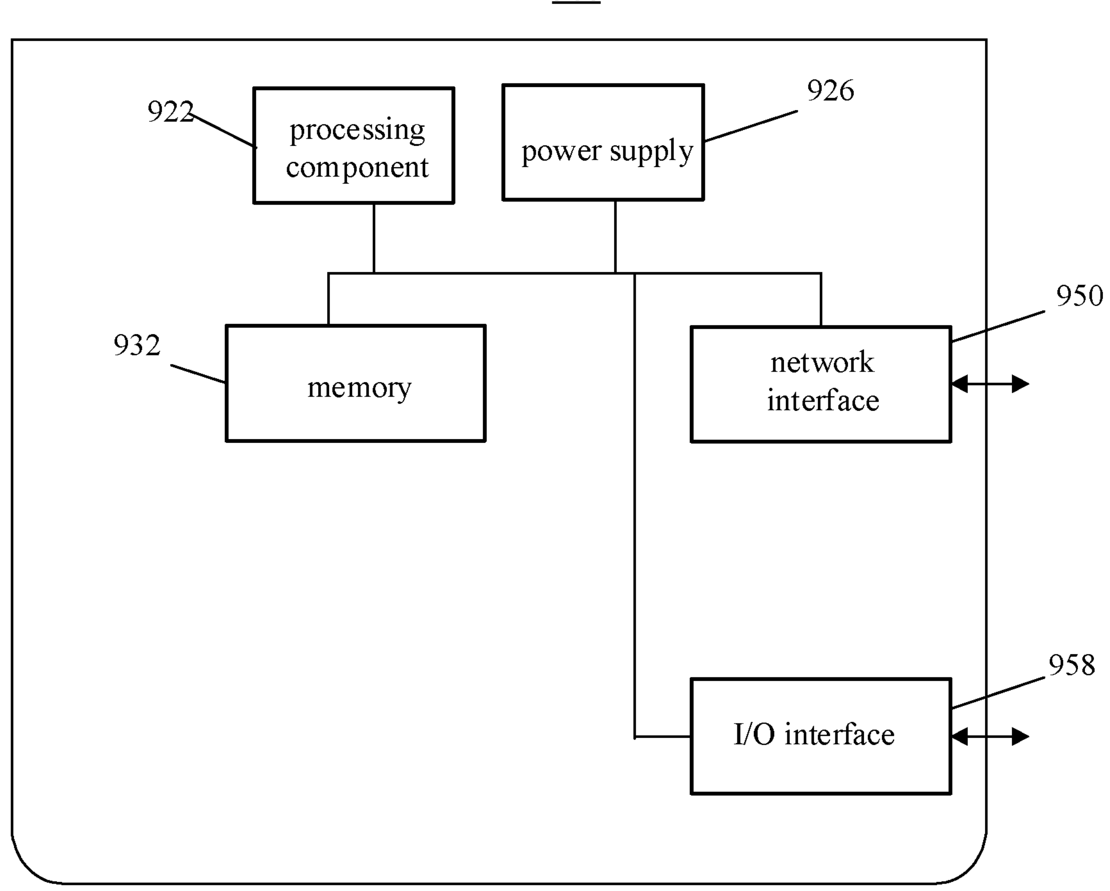
FIG. 20

METHOD FOR REPORTING TERMINAL CAPABILITY INFORMATION, AND COMMUNICATION DEVICE

CROSS-REFERENCE TO RELATED APPLICATION

This application is a national phase of International Application No. PCT/CN2021/089359, filed on Apr. 23, 2021, the entire content of which is incorporated herein by reference.

TECHNICAL FIELD

The disclosure relates to the field of wireless communication technologies, and particularly to a method for reporting terminal capability information, and a communication device.

BACKGROUND

With the constant development of the wireless communication networks, different types of terminals are introduced, for example, a reduced capability (redcap) terminal. The redcap terminal should satisfy the following requirements: 1, low cost and low complexity; 2, a certain degree of coverage enhancement; and 3, power saving. When the redcap terminal is introduced, since an application scenario of the redcap terminal is different from an application scenario of a common terminal, a wireless communication mechanism associated with the redcap terminal should be adjusted adaptively.

SUMMARY

A method for reporting terminal capability information is disclosed and performed by a terminal. The method includes: sending the terminal capability information to a base station in a random access procedure. The terminal capability information is configured to indicate a terminal capability supported by the terminal.

A method for reporting terminal capability information is provided and performed by a base station. The method includes: receiving the terminal capability information sent by a terminal in a random access procedure, in which the terminal capability information is configured to indicate a terminal capability supported by the terminal; and sending the terminal capability information to a core network device.

A method for reporting terminal capability information is provided and performed by a core network device. The method includes: receiving the terminal capability information sent by a base station. The terminal capability information is configured to indicate a terminal capability supported by a terminal and the terminal capability information is information acquired in a random access procedure.

BRIEF DESCRIPTION OF THE DRAWINGS

FIG. 14 is a flowchart illustrating a method for reporting terminal capability information, performed by a core network device, according to some embodiments.

FIG. 15 is a flowchart illustrating a method for reporting terminal capability information, performed by a core network device, according to some embodiments.

FIG. 20 is a block diagram illustrating a base station according to some embodiments.

DETAILED DESCRIPTION

Reference may now be made in detail to embodiments, examples of which are illustrated in the accompanying drawings. The following description refers to the accompanying drawings in which the same numbers in different drawings represent the same or similar elements unless otherwise represented. The implementations set forth in the following description of the embodiments do not represent all implementations consistent with the embodiments of the disclosure. Instead, they are merely examples of apparatuses and methods consistent with aspects related to the embodiments of the disclosure as recited in the appended claims.

Terms used in embodiments of the disclosure are merely for describing specific examples and are not intended to limit the embodiments of the disclosure. The singular forms "a" and "the" used in the embodiments of the disclosure and the appended claims are also intended to include a multiple form, unless other meanings are clearly represented in the context. It should also be understood that the term "and/or" used in the disclosure refers to any or all of possible combinations including one or more associated listed items.

It should be understood that although terms "first", "second", "third", and the like are used in the embodiments of the disclosure to describe various information, the information is not limited to the terms. These terms are merely used to differentiate information of a same type. For example, without departing from the scope of the embodiments of the disclosure, first information is also referred to as second information, and similarly the second information is also referred to as the first information. Depending on the context, for example, the term "if" used herein may be explained as "when" or "while", or "in response to . . . , it is determined that".

For the purpose of concision and ease of understanding, the term "greater than" or "less than" is used herein when characterizing the relationship of sizes. However, those skilled in the art may understand that the term "greater than" also covers the meaning of "greater than or equal to" and "less than" also covers the meaning of "less than or equal to".

Figure 1:
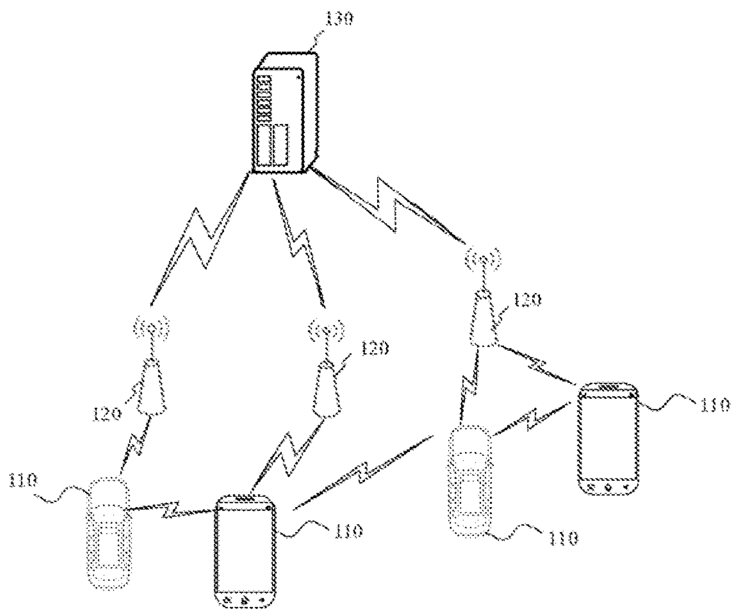
FIG. 1 is a diagram illustrating a structure of a wireless communication system according to some embodiments.

With reference to FIG. 1, it illustrates a schematic structural diagram of a wireless communication system in some embodiments of the disclosure. As illustrated in FIG. 1, the wireless communication system is a communication system based on mobile communication technologies. The wireless communication system may include several user equipments (UEs) 110 and several base stations 120.

The user equipment 110 may be a device that provides voice and/or data connectivity to a user. The user equipment 110 may communicate with one or more core networks via a radio access network (RAN). The user equipment 110 may be an Internet of Things (IoT) user equipment such as a sensor device, a mobile phone, and a computer with the IoT user equipment such as a fixed, portable, pocket-sized, handheld, built-in computer or vehicle-mounted device, for example, station (STA), subscriber unit, subscriber station, mobile station, mobile, remote station, access point, remote terminal, access terminal, user terminal, user agent, user device, or user equipment. Alternatively, the user equipment 110 may also be a device of an unmanned aircraft. Alternatively, the user equipment 110 may also be a vehicle-mounted device, for example, a trip computer having a wireless communication function or a wireless communication device connected to an external trip computer. Alternatively, the user equipment 110 may also be a roadside device, for example, a street lamp, a signal lamp, or other roadside device, having the wireless communication function.

The base station 120 may be a network side device in the wireless communication system. The wireless communication system may be the 4th generation mobile communication (4G) system, also known as the long term evolution (LTE) system. The wireless communication system may also be the 5th generation mobile communication (5G) system, also known as the new radio (NR) system or 5G NR system. Alternatively, the wireless communication system may also be a next-generation system of the 5G system. The access network in the 5G system may be called the new generation-radio access network (NG-RAN).

The base station 120 may be an evolved base station (eNB) adopted in the 4G system. Alternatively, the base station 120 may also be a base station (gNB) adopting a centralized and distributed architecture in the 5G system. When the base station 120 adopts the centralized distributed architecture, it usually includes a central unit (CU) and at least two distributed units (DUs). The CU is provided with a protocol stack of a packet data convergence protocol (PDCP) layer, a radio link control (RLC) layer, and a media access control (MAC) layer. The DU is provided with a protocol stack having a physical (PHY) layer. The embodiments of the disclosure may not limit the specific implementation manner of the base station 120.

A wireless link may be established between the base station 120 and the user equipment 110 through a wireless air interface. In different embodiments, the wireless air interface is a wireless air interface based on the 4G standard. Alternatively, the wireless air interface is a wireless air interface based on the 5G standard, for example, the wireless air interface is an NR. The wireless air interface may also be a wireless air interface based on a standard of next generation mobile communication network technology based on the 5G standard.

In some embodiments, an end to end (E2E) link may also be established between the user equipments 110, for example, a vehicle to vehicle (V2V) communication, a vehicle to infrastructure (V2I) communication, and a vehicle to pedestrian (V2P) communication, in a vehicle to everything (V2X) communication.

The above-mentioned user equipment may be regarded as the terminal device of the following embodiments.

In some embodiments, the above wireless communication system may also include a network management device 130.

The base stations 120 are coupled to the network management device 130 respectively. The network management device 130 may be a core network device in the wireless communication system. For example, the network management device 130 may be a mobility management entity (MME) of an evolved packet core (EPC). Alternatively, the network management device may also be other core network devices, such as a serving gateway (SGW), a public data network gateway (PGW), a policy and charging rules function (PCRF) unit, or a home subscriber server (HSS). The implementation form of the network management device 130 is not limited in the embodiments of the disclosure.

In order to facilitate those skilled in the art to understand, the embodiments of the disclosure enumerate implementation manners to clearly illustrate the technical solutions of the embodiments of the disclosure. Of course, those skilled in the art may understand that the embodiments provided in the disclosure may be executed independently, or may be combined with the methods of other embodiments of the disclosure to be executed together, or may be executed together with some methods in other related technologies after being executed alone or being combined to execute, which is limited in the embodiments of the disclosure.

In order to better understand the technical solution described in any embodiment of the disclosure, a scenario where the terminal accesses the network in the related art is described first.

In some embodiments, the base station sends indication information to the terminal. The indication information is configured to indicate whether a redcap terminal may reside on a cell or a frequency. The indication information may be determined based on a number of antennas of the terminal.

In some embodiments, a definition of a terminal type is specified and includes a capability of identifying the redcap terminal, limiting redcap capabilities only for the redcap terminal, and preventing the redcap terminal from using capabilities not belonging to the redcap terminal. The capabilities not belonging to the redcap terminal at least includes carrier aggregation, dual connectivity, and a wider bandwidth.

In some embodiments, a terminal with a single antenna is not allowed to access the network. The network configuration does not allow the terminal with the single antenna to access the network.

In some embodiments, a minimum physical layer capability set is defined for the redcap terminal, e.g., a physical layer capability set indicating a single antenna and a 20 MHz bandwidth. The network allows the redcap terminal having the terminal capability indicated by the minimum physical layer capability set to access the network. In some embodiments, after a radio resource control (RRC) connection is established, the terminal should report more terminal capabilities.

Figure 2:
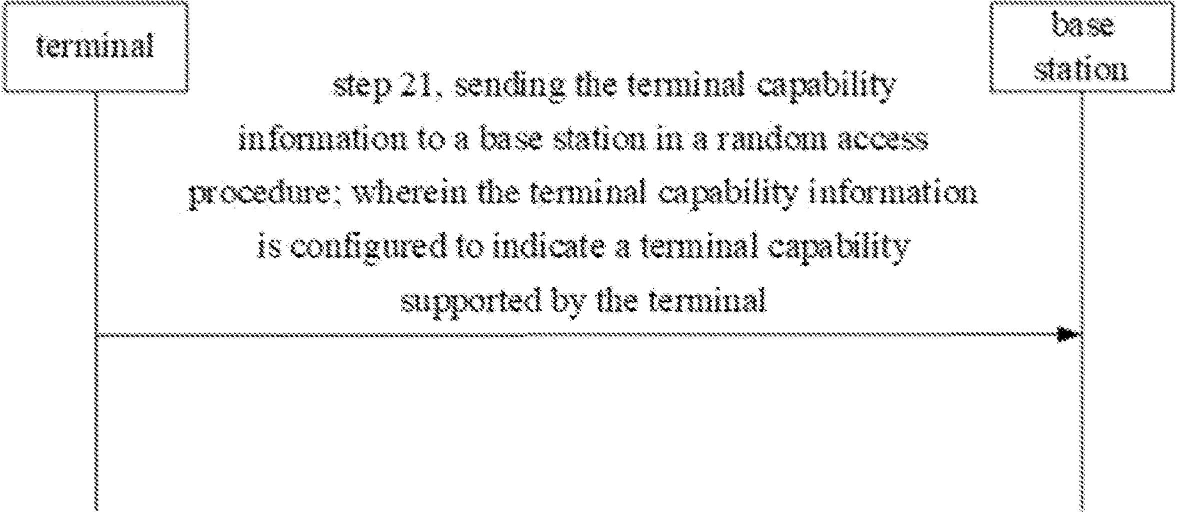
FIG. 2 is a flowchart illustrating a method for reporting terminal capability information, performed by a terminal, according to some embodiments.

As illustrated in FIG. 2, a method for reporting terminal capability information is provided in some embodiments and performed by a terminal. The method includes the following step.

At step 21, the terminal capability information is sent to a base station in a random access procedure.

The terminal capability information is configured to indicate a terminal capability supported by the terminal.

The terminal may be, but not limited to, a mobile phone, a wearable device, a vehicle-mounted terminal, a road side unit (RSU), a smart home terminal, an industrial sensing device and/or a medical device, and the like. The terminal may be a redcap terminal.

Different types of terminals may support different terminal capabilities. The terminal capability may be a terminal access layer capability. In some embodiments, the terminal capability supported by the terminal may be indicated by parameters such as a number of antennas and different communication bandwidths. For example, the terminal is the redcap terminal indicating to support 1 antenna and a 20 MHz communication bandwidth. It should be noted that the terminal capability supported by the terminal may be reported via a plurality of report occasions. A part of terminal capabilities in all terminal capabilities may be reported each time. For example, all the terminal capabilities supported by the terminal are 2 antennas and a 40 MHz communication bandwidth. The terminal may report the terminal capability for supporting the 1 antenna and the 20 MHz communication bandwidth first when reporting the terminal capability for the first time and report the terminal capability for supporting the 2 antennas and the 40 MHz communication bandwidth when reporting the terminal capability for the second time.

In some embodiments, in response to the base station receiving the terminal capability information, it is determined whether the terminal is capable of residing on a cell corresponding to the base station based on the terminal capability information. For example, the terminal only supporting the terminal capability of the single antenna is not allowed to access the network. In some embodiments, the base station sends indication information to the terminal. The indication information is configured to indicate whether the terminal may reside on the cell. The indication information may be determined based on a number of antennas of the terminal and/or a communication bandwidth. The terminal may determine whether to reside on the cell in response to receiving the indication information.

In some embodiments, the terminal capability information may be sent to the base station by using a random access message in the random access procedure. The random access message may include at least one of: message 1 (Msg1); message 3 (Msg3); or message 5 (Msg5). The Msg1, the Msg3, and the Msg5 are random access messages in the initial access between the terminal and the base station. The initial access may include Msg1, Msg2, Msg3, Msg4, and Msg5. The terminal sends the Msg 1 (preamble) to the base station. The base station sends the Msg 2 (response) to the terminal. Once the terminal receives the Msg2 and decode the content of the Msg2, the terminal sends the Msg3 (RRC Connection Request) to the base station. As soon as the terminal transmit the Msg3 (RRC Connection Request), the terminal starts monitoring to receive the Msg4 from the base station. Once the terminal received the Msg4, it decodes Msg4 and it completes the initial process. And then the terminal sends the Msg 5 to the base station to send an acknowledgement The terminal capability information for indicating all terminal capabilities may be sent to the base station by using one random access message, for example, the terminal capability information for indicating all the terminal capabilities is sent to the base station by using the Msg1. The terminal capability information for indicating all the terminal capabilities may be further sent to the base station by using a plurality of random access messages. The terminal capability information for indicating a part of terminal capabilities is sent to the base station by using the Msg1 and the terminal capability information for indicating the other part of terminal capabilities is sent to the base station by using the Msg3.

In some embodiments, the terminal capability information may be carried in the random access message. In some embodiments, information on the number of antennas and communication bandwidth of the terminal may be directly carried in the random access message. The information on the number of antennas and communication bandwidth may be indicated by a preset field. For example, the preset field may indicate that the number of antennas of the terminal is 2 and the communication bandwidth is 40 MHz. Thus, the base station may determine the terminal capability of the terminal when receiving the random access message.

In some embodiments, the random access message includes the Msg1 and the terminal sends the random access message by using a physical random access channel (PRACH) resource. The PRACH resource may be a random access preamble and a random access channel opportunity (RO). The terminal determines the PRACH resource based on the terminal type before sending the Msg1. The terminal type may indicate the terminal capability supported by the terminal. When the base station receives the Msg1 sent by using the PRACH resource, the base station may determine the terminal type of the terminal based on the PRACH resource of the Msg1, and determine the terminal capability of the terminal based on the terminal type. For example, when the terminal is a redcap terminal type and the terminal capability is 1 antenna and 20 MHz, the Msg1 is sent by using the first PRACH resource, and the base station determines that the terminal is the redcap terminal type based on the first PRACH resource when receiving the Msg1, and it is determined that the terminal capability supports the 1 antenna and the 20 MHz.

In some embodiments, the PRACH resource includes at least one of: a random access preamble or an RO.

In some embodiments, the terminal type includes a redcap terminal type.

In some embodiments, the terminal capability information indicates at least one predetermined minimum terminal capability set and the minimum terminal capability set includes at least one first terminal capability parameter. The terminal and the base station may acquire the at least one first terminal capability parameter included in the minimum terminal capability set in advance.

In some embodiments, the first terminal capability parameter includes at least one of: a number of antennas or a bandwidth.

In some embodiments, when the terminal sends the terminal capability information for indicating the minimum terminal capability set by using the Msg1, the terminal may further send more terminal capabilities by using the Msg2 and the Msg3. For example, the first terminal capability parameter included in the minimum terminal capability set includes a first number of antennas and a first bandwidth. The first number of antennas is 1 and the first bandwidth is 20 MHz. The terminal may further send a second number of antennas and a second bandwidth by using the Msg5. The first number of antennas is 2 and the second bandwidth is 40 MHz.

In some embodiments, when the first terminal capability information has been sent based on the random access message, the terminal capability information sent to the base station by using the terminal capability report message may not include the first terminal capability information. The terminal capability information sent to the base station by using the terminal capability report message may be second terminal capability information other than the first terminal capability information.

In embodiments of the disclosure, the terminal capability information is sent to the base station in the random access procedure, in which the terminal capability information is configured to indicate the terminal capability supported by the terminal. First, since the base station may acquire the terminal capability information of the terminal, it may determine whether to allow the terminal to access the network based on the terminal capability information. Second, since the base station may acquire the terminal capability information of the terminal in the random access procedure, the base station may acquire the terminal capability information in advance and reduce a signaling overhead compared with acquiring the terminal capability information via the terminal capability report message.

It should be noted that those skilled in the art may understand that the methods provided in the embodiments of the disclosure may be executed alone or may be executed together with some methods in the embodiments of the disclosure or some methods in the related art.

Figures 3, 4:
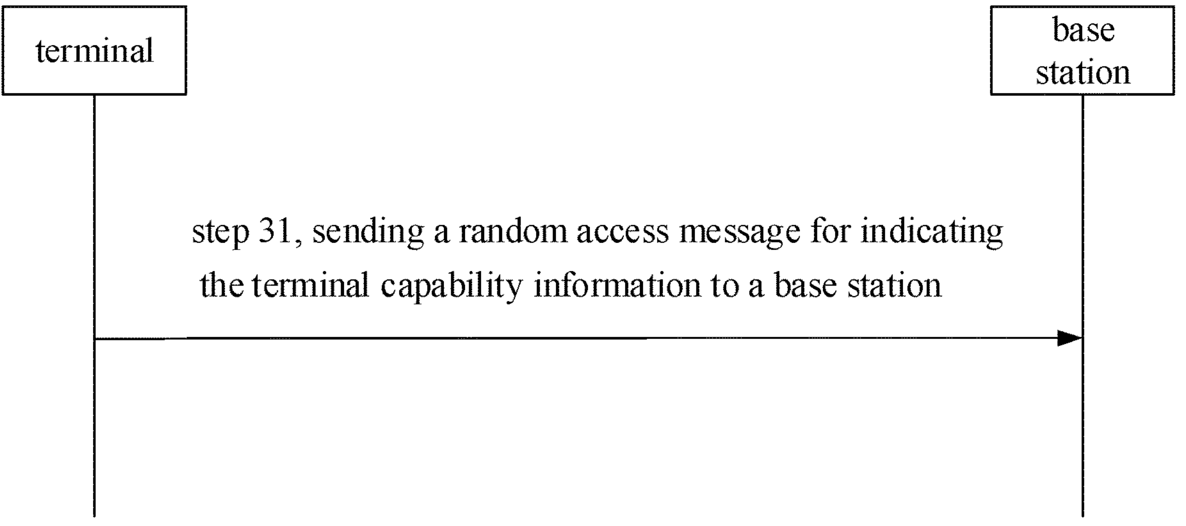
FIG. 3 is a flowchart illustrating a method for reporting terminal capability information, performed by a terminal, according to some embodiments.
FIG. 4 is a flowchart illustrating a method for reporting terminal capability information, performed by a terminal, according to some embodiments.

As illustrated in FIG. 3, a method for reporting terminal capability information is provided in some embodiments and performed by a terminal. The method includes the following step.

At step 31, a random access message for indicating the terminal capability information is sent to a base station.

In some embodiments, the random access message includes at least one of: Msg1, Msg3, or Msg5.

In some embodiments, the terminal capability information may be sent by only using one random access message in the random access procedure.

In some embodiments, the terminal capability information for indicating all terminal capabilities may be sent to the base station by using one random access message, for example, the terminal capability information for indicating all the terminal capabilities is sent to the base station by using the Msg1. The terminal capability information may be determined in advance.

In some embodiments, the terminal capability information may be sent by using a plurality of random access messages in the random access procedure.

In some embodiments, the terminal capability information for indicating all the terminal capabilities may be sent to the base station by using the plurality of random access messages. The terminal capability information for indicating a part of terminal capabilities is sent to the base station by using the Msg1 and the terminal capability information for indicating the other part of terminal capabilities is sent to the base station by using the Msg3. The terminal capability information sent by the Msg1 indicates at least one predetermined minimum terminal capability set. The minimum terminal capability set includes at least one first terminal capability parameter. The terminal and the base station may acquire the at least one first terminal capability parameter included in the minimum terminal capability set in advance.

It should be noted that those skilled in the art may understand that the methods provided in the embodiments of the disclosure may be executed alone or may be executed together with some methods in the embodiments of the disclosure or some methods in the related art.

As illustrated in FIG. 4, a method for reporting terminal capability information is provided in some embodiments and performed by a terminal. The method includes the following step.

At step 41, a random access message is sent to a base station based on a PRACH resource.

The PRACH resource is determined according to a terminal type of the terminal and the terminal type is configured to indicate a terminal capability supported by the terminal.

In some embodiments, the PRACH resource includes at least one of: a random access preamble or an RO.

In some embodiments, PRACH resources allocated to different terminal types of terminals are different.

In some embodiments, a PRACH resource determined based on a first terminal type is a first PRACH resource; and a PRACH resource determined based on a second terminal type is a second PRACH resource. When the base station receives the random access message sent by the terminal by using the first PRACH resource, it may be determined that the terminal is the first type of terminal; and when the base station receives the random access message sent by the terminal by using the second PRACH resource, it may be determined that the terminal is the second type of terminal.

In some embodiments, the random access message includes the Msg1, and the terminal sends the random access message by using the PRACH resource. The PRACH resource may be a random access preamble and an RO. The terminal determines the PRACH resource based on the terminal type of the terminal before sending the Msg1. The terminal type may indicate the terminal capability supported by the terminal. When the base station receive the Msg1 sent by using the PRACH resource, the base station may determine the terminal type of the terminal based on the PRACH resource of the Msg1, and determine the terminal capability of the terminal based on the terminal type. For example, when the terminal is a redcap terminal type, and the terminal capability is 1 antenna and 20 MHz, the Msg1 is sent by using the first PRACH resource, and the base station determines that the terminal is the redcap terminal type based on the first PRACH resource when receiving the Msg1 and it is determined that the terminal capability supports the 1 antenna and the 20 MHz.

It should be noted that those skilled in the art may understand that the methods provided in the embodiments of the disclosure may be executed alone or may be executed together with some methods in the embodiments of the disclosure or some methods in the related art.

In some embodiments, the terminal capability information is configured to indicate at least one predetermined minimum terminal capability set and the minimum terminal capability set includes at least one first terminal capability parameter.

The terminal and the base station may determine the at least one first terminal capability parameter included in the minimum terminal capability set in advance.

In some embodiments, the first terminal capability parameter includes at least one of: a number of antennas or a bandwidth.

For example, the minimum terminal capability set includes a parameter of 1 antenna and 20 MHz; or the minimum terminal capability set includes a parameter of 2 antennas and 20 MHz; or the minimum terminal capability set includes a parameter of 1 antenna and 40 MHz.

It should be noted that those skilled in the art may understand that the methods provided in the embodiments of the disclosure may be executed alone or may be executed together with some methods in the embodiments of the disclosure or some methods in the related art.

Figure 5:
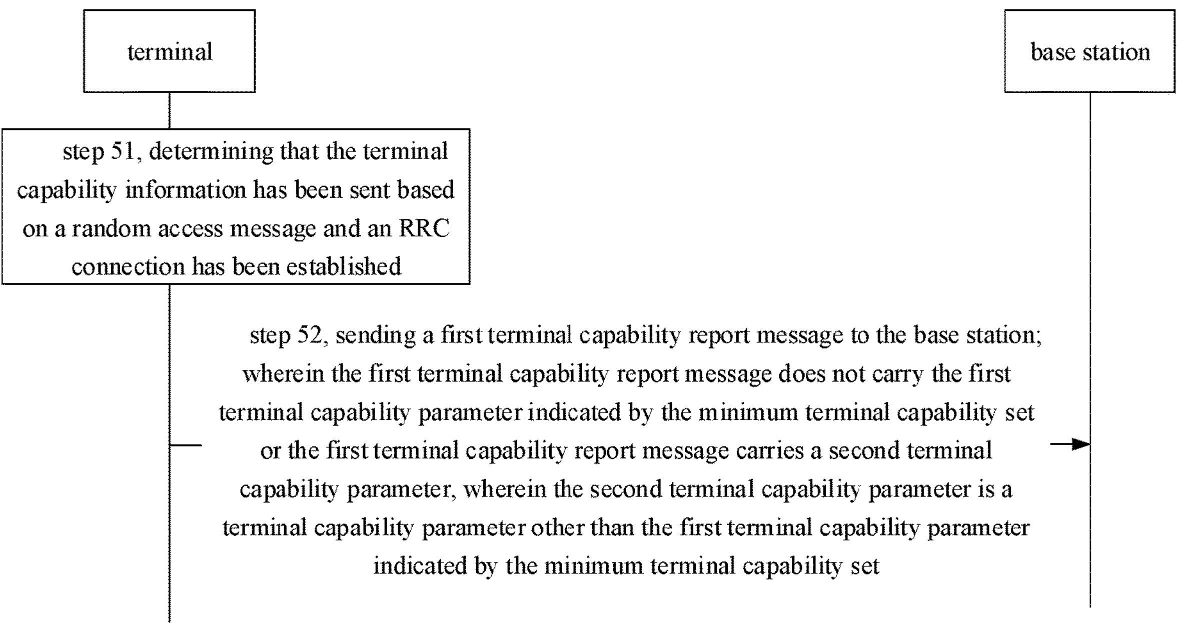
FIG. 5 is a flowchart illustrating a method for reporting terminal capability information, performed by a terminal, according to some embodiments.

As illustrated in FIG. 5, a method for reporting terminal capability information is provided in some embodiments and performed by a terminal. The method includes the following steps.

At step 51, it is determined that the terminal capability information has been sent based on a random access message and an RRC connection has been established.

A first terminal capability report message is reported to the base station.

The first terminal capability report message does not carry the first terminal capability parameter indicated by the minimum terminal capability set or the first terminal capability report message carries a second terminal capability parameter. The second terminal capability parameter is a terminal capability parameter other than the first terminal capability parameter indicated by the minimum terminal capability set.

In some embodiments, after the RRC connection is established, the first terminal capability report message may be sent to the base station.

In some embodiments, indication information sent by the base station is received. The indication information is configured to indicate that the base station has acquired the terminal capability information based on the random access message. When the indication information is received, it is determined that the terminal capability information has been acquired based on the random access message.

In some embodiments, the first terminal capability parameter and/or the second terminal capability parameter includes at least one of: a number of antennas or a bandwidth.

For example, the minimum terminal capability set indicates that the number of antennas is 1 and the communication bandwidth is 20 MHz; and a value of the second terminal capability parameter may indicate that the number of antennas is 2 and the communication bandwidth is 40 MHz Since the first terminal capability report message follows sending the terminal capability information for indicating the minimum terminal capability set by using the random access message, it's not necessary to send the terminal capability information for indicating the minimum terminal capability set by using the first terminal capability report message, which may save a signaling overhead.

It should be noted that those skilled in the art may understand that the methods provided in the embodiments of the disclosure may be executed alone or may be executed together with some methods in the embodiments of the disclosure or some methods in the related art.

Figure 6:
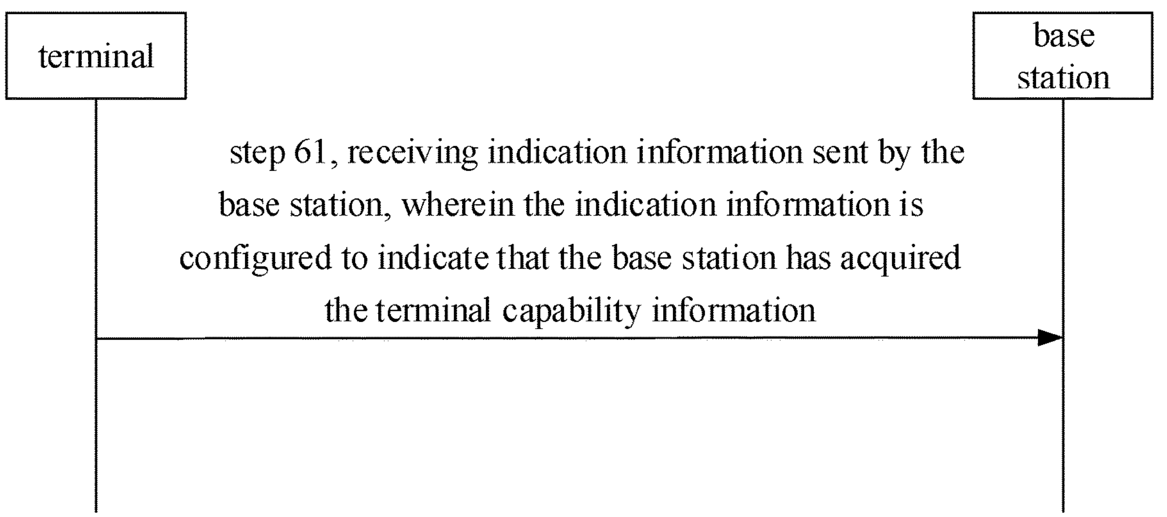
FIG. 6 is a flowchart illustrating a method for reporting terminal capability information, performed by a terminal, according to some embodiments.

As illustrated in FIG. 6, a method for reporting terminal capability information is provided in some embodiments and performed by a terminal. The method includes the following step.

At step 61, indication information sent by the base station is received. The indication information is configured to indicate that the base station has acquired the terminal capability information.

In some embodiments, the indication information sent by the base station is received. The indication information is configured to indicate that the base station has acquired the terminal capability information based on the random access message. When the indication information is received, it is determined that the terminal capability information has been acquired based on the random access message.

In some embodiments, the base station sends the indication information to the terminal in response to receiving the random access message for indicating the terminal capability information.

In some embodiments, a first terminal capability report message is sent to the base station in response to the terminal capability information having been sent based on the random access message. The first terminal capability report message does not carry the first terminal capability parameter indicated by the minimum terminal capability set or carries a second terminal capability parameter other than the first terminal capability parameter indicated by the minimum terminal capability set.

It should be noted that those skilled in the art may understand that the methods provided in the embodiments of the disclosure may be executed alone or may be executed together with some methods in the embodiments of the disclosure or some methods in the related art.

Figure 7:
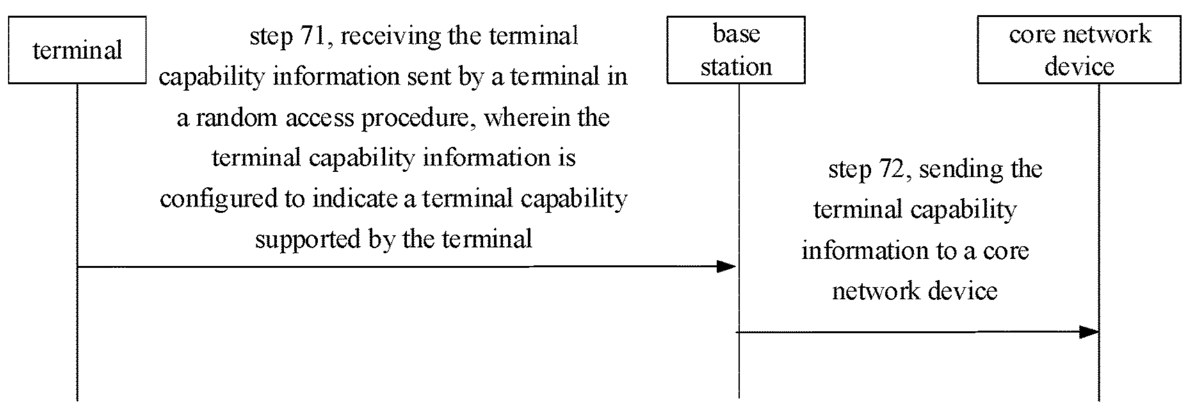
FIG. 7 is a flowchart illustrating a method for reporting terminal capability information, performed by a base station, according to some embodiments.

As illustrated in FIG. 7, a method for reporting terminal capability information is provided in some embodiments and performed by a base station. The method includes the following steps.

At step 71, the terminal capability information sent by a terminal in a random access procedure is received. The terminal capability information is configured to indicate a terminal capability supported by the terminal.

At step 72, the terminal capability information is sent to a core network device.

Different types of terminals may support different terminal capabilities. The terminal capability may be a terminal access layer capability. In some embodiments, the terminal capability supported by the terminal may be indicated by parameters such as a number of antennas and different communication bandwidths. For example, the terminal is the redcap terminal indicating to support 1 antenna and a 20 MHz communication bandwidth. It should be noted that the terminal capability supported by the terminal may be reported via a plurality of report occasions. A part of terminal capabilities in all terminal capabilities may be reported each time. For example, all the terminal capabilities supported by the terminal are 2 antennas and a 40 MHz communication bandwidth. The terminal may report the terminal capability for supporting the 1 antenna and the 20 MHz communication bandwidth first when reporting the terminal capability for the first time and report the terminal capability for supporting the 2 antennas and the 40 MHz communication bandwidth when reporting the terminal capability for the second time.

In some embodiments, in response to the base station receiving the terminal capability information, it is determined whether the terminal is capable of residing on a cell corresponding to the base station based on the terminal capability information. For example, the terminal only supporting the terminal capability of the single antenna is not allowed to access the network. In some embodiments, the base station sends indication information to the terminal. The indication information is configured to indicate whether the terminal may reside on the cell. The indication information may be determined based on a number of antennas of the terminal and/or a communication bandwidth. The terminal may determine whether to reside on the cell in response to receiving the indication information.

In some embodiments, the base station may receive, by using a random access message in the random access procedure, the terminal capability information sent by the terminal to the base station. The random access message may include at least one of: Msg1, Msg3, or Msg5. The terminal may send the terminal capability information for indicating all terminal capabilities to the base station by using one random access message, for example, the terminal sends the terminal capability information for indicating all the terminal capabilities to the base station by using the Msg1. The terminal may further send the terminal capability information for indicating all the terminal capabilities to the base station by using a plurality of random access messages. For example, the terminal sends the terminal capability information for indicating a part of terminal capabilities to the base station by using the Msg1, and sends the terminal capability information for indicating the other part of terminal capabilities to the base station by using the Msg3.

In some embodiments, the terminal capability information may be carried in the random access message. In some embodiments, information on the number of antennas and communication bandwidth of the terminal may be directly carried in the random access message. The information on the number of antennas and communication bandwidth may be indicated by a preset field. For example, the preset field may indicate that the number of antennas of the terminal is 2 and the communication bandwidth is 40 MHz. Thus, the base station may determine the terminal capability of the terminal when receiving the random access message and determine whether to allow the terminal to access the network based on the terminal capability.

In some embodiments, the random access message includes the Msg1 and the terminal sends the random access message by using a PRACH resource. The PRACH resource may be a random access preamble and an RO. The terminal determines the PRACH resource based on the terminal type before sending the Msg1. The terminal type may indicate the terminal capability supported by the terminal. When the base station receives the Msg1 sent by using the PRACH resource, the base station may determine the terminal type of the terminal based on the PRACH resource of the Msg1, and determine the terminal capability of the terminal based on the terminal type. For example, when the terminal is a redcap terminal type and the terminal capability is 1 antenna and 20 MHZ, the Msg1 is sent by using the first PRACH resource, and the base station determines that the terminal is the redcap terminal type based on the first PRACH resource when receiving the Msg1, and it is determined that the terminal capability supports the 1 antenna and the 20 MHz.

In some embodiments, the PRACH resource includes at least one of: a random access preamble or an RO.

In some embodiments, the terminal type includes a redcap terminal type.

In some embodiments, the terminal capability information indicates at least one predetermined minimum terminal capability set and the minimum terminal capability set includes at least one first terminal capability parameter. The terminal and the base station may acquire the at least one first terminal capability parameter included in the minimum terminal capability set in advance.

In some embodiments, the first terminal capability parameter includes at least one of: a number of antennas or a bandwidth.

In some embodiments, when the terminal sends the terminal capability information for indicating the minimum terminal capability set by using the Msg1, the terminal may further send more terminal capability information by using the Msg2 and the Msg3. The first terminal capability parameter included in the minimum terminal capability set includes a first number of antennas and a first bandwidth. The first number of antennas is 1 and the first bandwidth is 20 MHz. The terminal may further send a second number of antennas and a second bandwidth by using the Msg5. The first number of antennas is 2 and the second bandwidth is 40 MHz. Correspondingly, when the base station receives the terminal capability information for indicating the minimum terminal capability sent by using the Msg1, the base station may further receive more terminal capability information by using the Msg2 and the Msg3.

In some embodiments, when the first terminal capability information has been sent based on the random access message, the terminal capability information sent to the base station by using the terminal capability report message may not include the first terminal capability information. The terminal capability information sent to the base station by using the terminal capability report message may be second terminal capability information other than the first terminal capability information.

In some embodiments, after receiving the terminal capability information sent by the terminal, the base station may send the terminal capability information to the core network device.

In some embodiments, the terminal capability information received by using the random access message may be independently sent to the core network device via a message.

In some embodiments, a second terminal capability report message for indicating the terminal capability information is sent to the core network device. The second terminal capability report message is a new message for transmitting data between the base station and the core network device.

In some embodiments, an initial terminal message for indicating the terminal capability information is sent to the core network device.

In other embodiments, the terminal capability information received by using the random access message and the terminal capability information received by using the first terminal capability message may be commonly sent to the core network device via a message.

In embodiments of the disclosure, the terminal capability information sent by the terminal in the random access procedure may be received. First, since the base station may acquire the terminal capability information of the terminal, it may determine whether to allow the terminal to access the network based on the terminal capability information. Second, since the base station may acquire the terminal capability information of the terminal in the random access procedure, the base station may acquire the terminal capability information in advance and reduce a signaling overhead compared with acquiring the terminal capability information via the terminal capability report message.

It should be noted that those skilled in the art may understand that the methods provided in the embodiments of the disclosure may be executed alone or may be executed together with some methods in the embodiments of the disclosure or some methods in the related art.

Figure 8:
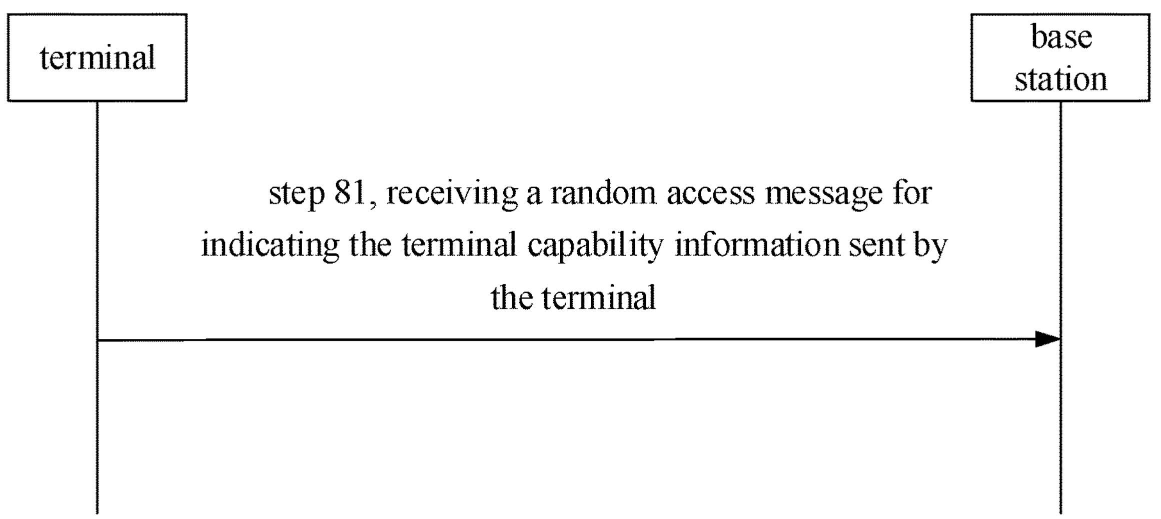
FIG. 8 is a flowchart illustrating a method for reporting terminal capability information, performed by a base station, according to some embodiments.

As illustrated in FIG. 8, a method for reporting terminal capability information is provided in some embodiment and performed by a base station. The method includes the following step.

At step 81, a random access message for indicating the terminal capability information sent by the terminal is received.

In some embodiments, the random access message includes at least one of: a first random access message Msg1, a third random access message Msg3, or a fifth random access message Msg5.

In some embodiments, the terminal capability information may be sent only by using one random access message in the random access procedure.

In some embodiments, the terminal capability information for indicating all terminal capabilities may be sent to the base station by using one random access message, for example, the terminal capability information for indicating all the terminal capabilities is sent to the base station by using the Msg1. The terminal capability information may be determined in advance.

In some embodiments, the terminal capability information may be sent by using a plurality of random access messages in the random access procedure.

In some embodiments, the terminal capability information for indicating all the terminal capabilities may be sent to the base station by using the plurality of random access messages. The terminal capability information for indicating a part of terminal capabilities is sent to the base station by using the Msg1 and the terminal capability information for indicating the other part of terminal capabilities is sent to the base station by using the Msg3. The terminal capability information sent by the Msg1 indicates at least one predetermined minimum terminal capability set. The minimum terminal capability set includes at least one first terminal capability parameter. The terminal and the base station may acquire the at least one first terminal capability parameter included in the minimum terminal capability set in advance.

It should be noted that those skilled in the art may understand that the methods provided in the embodiments of the disclosure may be executed alone or may be executed together with some methods in the embodiments of the disclosure or some methods in the related art.

Figure 9:
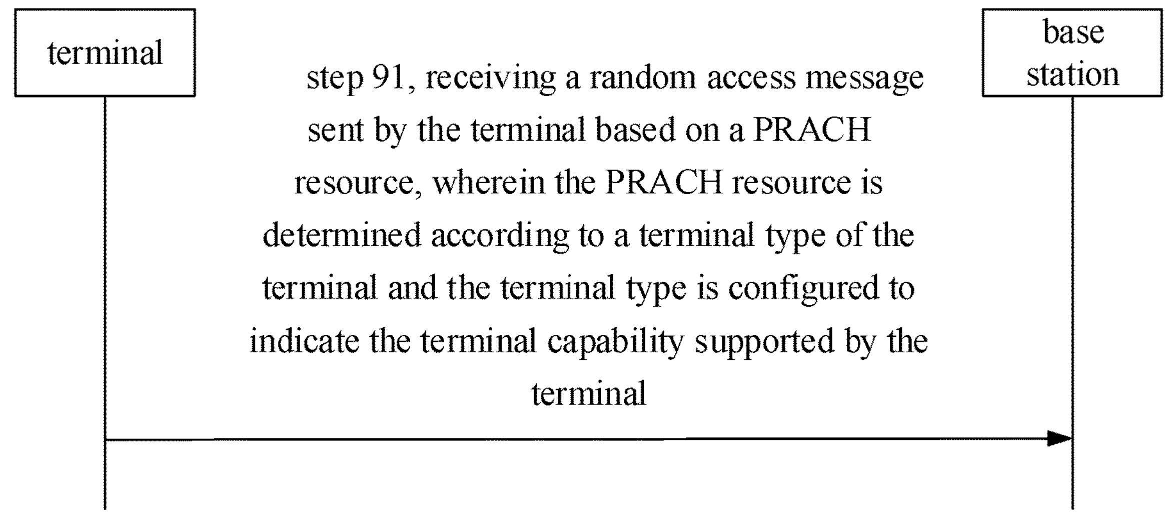
FIG. 9 is a flowchart illustrating a method for reporting terminal capability information, performed by a base station, according to some embodiments.

As illustrated in FIG. 9, a method for reporting terminal capability information is provided in some embodiments and performed by a base station. The random access message includes Msg1. The method includes the following step.

At step 91, a random access message sent by the terminal based on a PRACH resource is received.

The PRACH resource is determined according to a terminal type of a terminal and the terminal type is configured to indicate a terminal capability supported by the terminal.

In some embodiments, the PRACH resource includes at least one of: a random access preamble or an RO.

In some embodiments, PRACH resources allocated to different terminal types of terminals are different.

In some embodiments, a PRACH resource determined based on a first terminal type is a first PRACH resource; and a PRACH resource determined based on a second terminal type is a second PRACH resource. When the base station receives the random access message sent by the terminal by using the first PRACH resource, it may be determined that the terminal is the first type of terminal; and when the base station receives the random access message sent by the terminal by using the second PRACH resource, it may be determined that the terminal is the second type of terminal.

In some embodiments, the random access message includes the Msg1 and the terminal sends the random access message by using a PRACH resource. The PRACH resource may be a random access preamble and an RO. The terminal determines the PRACH resource based on the terminal type before sending the Msg1. The terminal type may indicate the terminal capability supported by the terminal. When the base station receives the Msg1 sent by using the PRACH resource, the base station may determine the terminal type of the terminal based on the PRACH resource of the Msg1, and determine the terminal capability of the terminal based on the terminal type. For example, when the terminal is a redcap terminal type and the terminal capability is 1 antenna and 20 MHz, the Msg1 is sent by using the first PRACH resource, and the base station determines that the terminal is the redcap terminal type based on the first PRACH resource when receiving the Msg1, and it is determined that the terminal capability supports the 1 antenna and the 20 MHz.

It should be noted that those skilled in the art may understand that the methods provided in the embodiments of the disclosure may be executed alone or may be executed together with some methods in the embodiments of the disclosure or some methods in the related art.

In some embodiments, the terminal capability information is configured to indicate at least one predetermined minimum terminal capability set and the minimum terminal capability set includes at least one first terminal capability parameter.

The terminal and the base station may determine the at least one first terminal capability parameter included in the minimum terminal capability set in advance.

In some embodiments, the first terminal capability parameter includes at least one of: a number of antennas or a bandwidth.

For example, the minimum terminal capability set includes a parameter of 1 antenna and 20 MHz; or the minimum terminal capability set includes a parameter of 2 antennas and 20 MHz; or the minimum terminal capability set includes a parameter of 1 antenna and 40 MHz.

It should be noted that those skilled in the art may understand that the methods provided in the embodiments of the disclosure may be executed alone or may be executed together with some methods in the embodiments of the disclosure or some methods in the related art.

Figure 10:
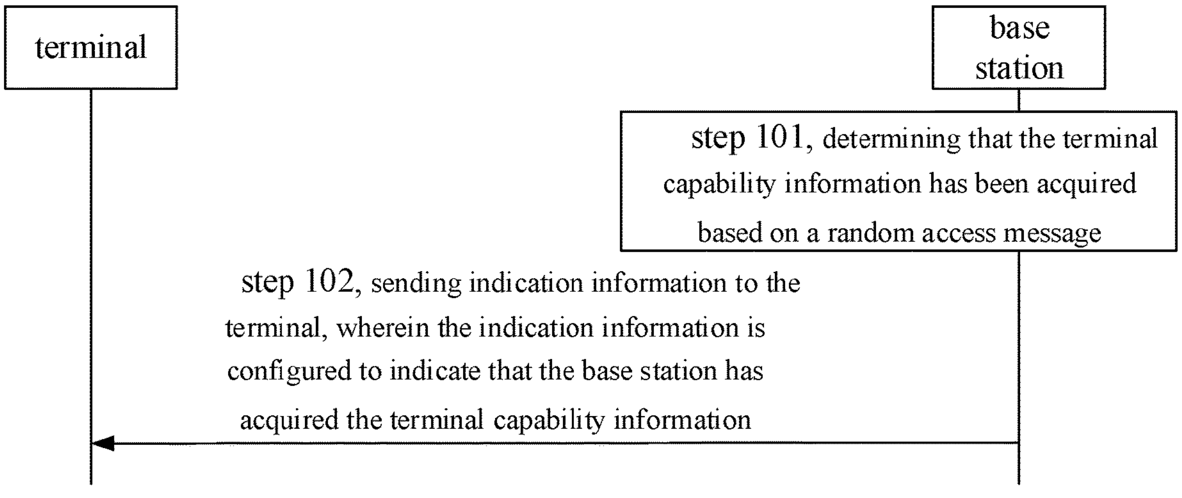
FIG. 10 is a flowchart illustrating a method for reporting terminal capability information, performed by a base station, according to some embodiments.

As illustrated in FIG. 10, a method for reporting terminal capability information is provided in some embodiments and performed by a base station. The method includes the following steps.

At step 101, it is determined that the terminal capability information has been acquired based on a random access message.

Indication information is sent to the terminal. The indication information is configured to indicate that the base station has acquired the terminal capability information.

In some embodiments, the terminal receives the indication information sent by the base station. The indication information is configured to indicate that the base station has acquired the terminal capability information. In response to the terminal receiving the indication information, the terminal determines that the terminal capability information has been acquired based on the random access message.

In some embodiments, the base station sends the indication information to the terminal when receives the random access message for indicating the terminal capability information.

In some embodiments, the terminal sends a first terminal capability report message to the base station in response to the terminal capability information having been sent based on the random access message. The first terminal capability report message does not carry the first terminal capability parameter indicated by the minimum terminal capability set or carries a second terminal capability parameter other than the first terminal capability parameter indicated by the minimum terminal capability set.

It should be noted that those skilled in the art may understand that the methods provided in the embodiments of the disclosure may be executed alone or may be executed together with some methods in the embodiments of the disclosure or some methods in the related art.

Figure 11:
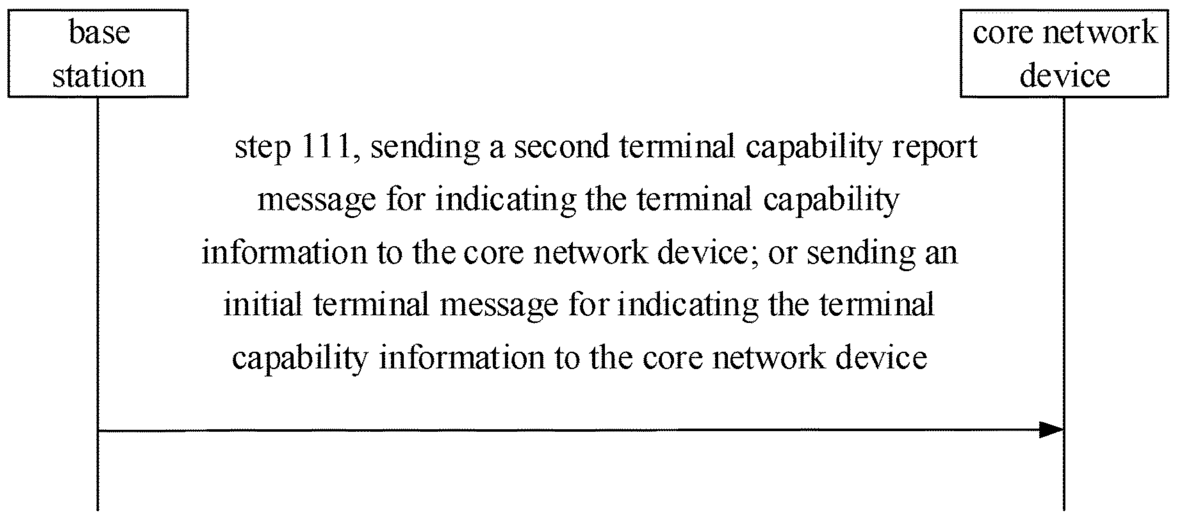
FIG. 11 is a flowchart illustrating a method for reporting terminal capability information, performed by a base station, according to some embodiments.

As illustrated in FIG. 11, a method for reporting terminal capability information is provided in some embodiments and performed by a base station. The method includes the following step.

At step 111, a second terminal capability report message for indicating the terminal capability information is sent to the core network device; or an initial terminal message for indicating the terminal capability information is sent to the core network device.

In some embodiments, the terminal capability information indicated by the second terminal capability report message and the initial terminal message is the terminal capability information received based on the random access message. The terminal capability information may be acquired from the random access message.

It should be noted that, the second terminal capability report message and the initial terminal message may carry the terminal capability information received by using the first terminal capability report message. It may be correspondingly processed based on predetermined rule information.

It should be noted that those skilled in the art may understand that the methods provided in the embodiments of the disclosure may be executed alone or may be executed together with some methods in the embodiments of the disclosure or some methods in the related art.

Figures 12, 13:
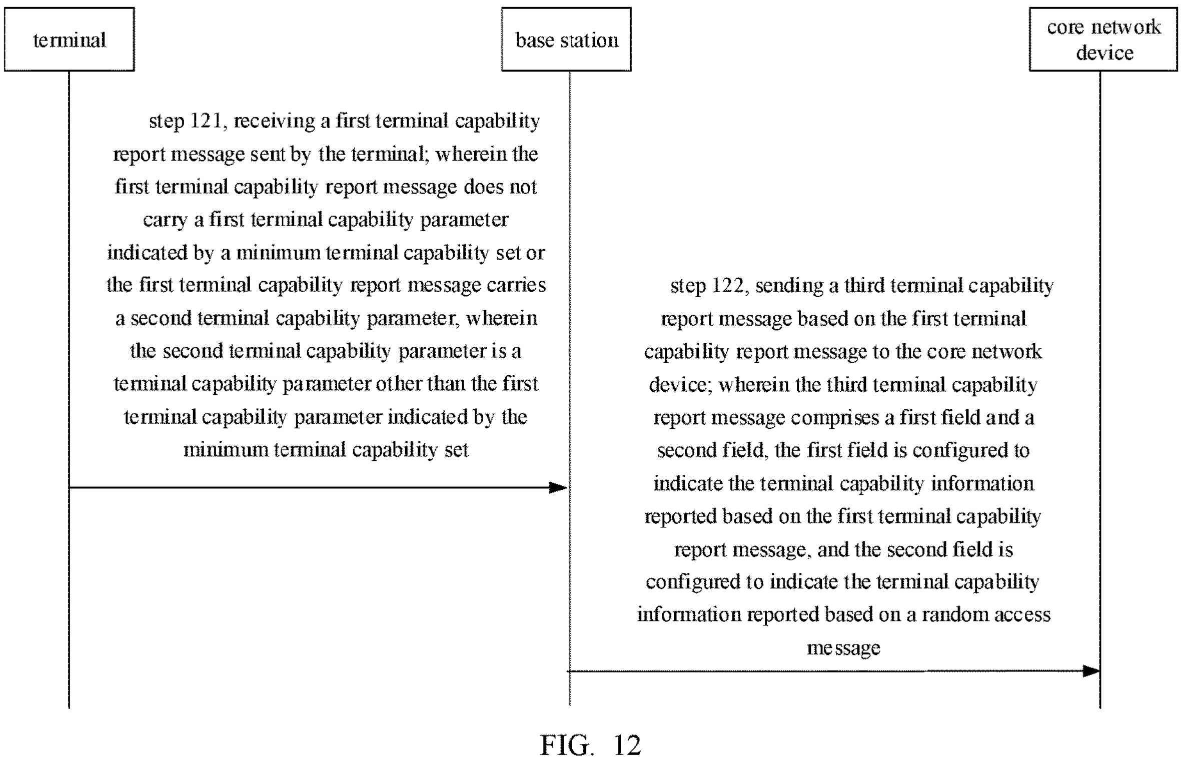
FIG. 12 is a flowchart illustrating a method for reporting terminal capability information, performed by a base station, according to some embodiments.
FIG. 13 is a flowchart illustrating a method for reporting terminal capability information, performed by a core network device, according to some embodiments.

As illustrated in FIG. 12, a method for reporting terminal capability information is provided in some embodiments and performed by a base station. The method includes the following steps.

At step 121, a first terminal capability report message sent by the terminal is received. The first terminal capability report message does not carry a first terminal capability parameter indicated by a minimum terminal capability set or the first terminal capability report message carries a second terminal capability parameter, in which the second terminal capability parameter is a terminal capability parameter other than the first terminal capability parameter indicated by the minimum terminal capability set.

At step 122, a third terminal capability report message is sent based on the first terminal capability report message to the core network device.

The third terminal capability report message includes a first field and a second field, the first field is configured to indicate the terminal capability information reported based on the first terminal capability report message, and the second field is configured to indicate the terminal capability information reported based on a random access message.

In some embodiments, after an RRC connection is established, the first terminal capability report message sent by the terminal may be received.

In some embodiments, the terminal receives indication information sent by the base station. The indication information is configured to indicate that the base station has acquired the terminal capability information. In response to receiving the indication information, the terminal determines that the terminal capability information has been sent based on the random access message.

In some embodiments, the first terminal capability parameter and/or the second terminal capability parameter includes at least one of: a number of antennas or a bandwidth.

For example, the minimum terminal capability set indicates that the number of antennas is 1 and the communication bandwidth is 20 MHz; and a value of the second terminal capability parameter may indicate that the number of antennas is 2 and the communication bandwidth is 40 MHz Since the first terminal capability report message follows sending the terminal capability information for indicating the minimum terminal capability set by using the random access message, it's not necessary to send the terminal capability information for indicating the minimum terminal capability set by using an additional terminal capability report message, which may save a signaling overhead.

In some embodiments, the terminal capability information indicated by the first field is reported based on the first terminal capability report message and the terminal capability information indicated by the second field is reported based on the random access message. Thus, two types of terminal capability information may be reported simultaneously based on the third terminal capability report message, which may reduce a signaling overhead.

In some embodiments, the third terminal capability report message includes one of: a UERadioAccessCapabilityInformation inter-node message or a UE RadioPagingInformation message.

In some embodiments, the third terminal capability report message is a UE RadioPagingInformation message; and the first field is a ue-RadioPagingInfo field.

It should be noted that those skilled in the art may understand that the methods provided in the embodiments of the disclosure may be executed alone or may be executed together with some methods in the embodiments of the disclosure or some methods in the related art.

In some embodiments, the ue-RadioPagingInfo field in the UE RadioPagingInformation message carries the terminal capability information reported by the terminal based on the first terminal capability report message;

and/or, a second field in the UE RadioPagingInformation message carries the terminal capability information reported by the terminal based on the random access message.

It should be noted that those skilled in the art may understand that the methods provided in the embodiments of the disclosure may be executed alone or may be executed together with some methods in the embodiments of the disclosure or some methods in the related art.

As illustrated in FIG. 13, a method for reporting terminal capability information is provided in some embodiments and performed by a core network device. The method includes the following step.

At step 131, the terminal capability information sent by a base station is received.

The terminal capability information is configured to indicate a terminal capability supported by a terminal. The terminal capability information is information acquired in a random access procedure.

Different types of terminals may support different terminal capabilities. The terminal capability may be a terminal access layer capability. In some embodiments, the terminal capability supported by the terminal may be indicated by parameters such as a number of antennas and different communication bandwidths. For example, the terminal is the redcap terminal indicating to support 1 antenna and a 20 MHz communication bandwidth. It should be noted that the terminal capability supported by the terminal may be reported via a plurality of report occasions. A part of terminal capabilities in all terminal capabilities may be reported each time. For example, all the terminal capabilities supported by the terminal are 2 antennas and a 40 MHz communication bandwidth. The terminal may report the terminal capability for supporting the 1 antenna and the 20 MHz communication bandwidth first when reporting the terminal capability for the first time and report the terminal capability for supporting the 2 antennas and the 40 MHz communication bandwidth when reporting the terminal capability for the second time.

In some embodiments, in response to the base station receiving the terminal capability information, it is determined whether the terminal is capable of residing on a cell corresponding to the base station based on the terminal capability information. For example, the terminal only supporting the terminal capability of the single antenna is not allowed to access the network. In some embodiments, the base station sends indication information to the terminal. The indication information is configured to indicate whether the terminal may reside on the cell. The indication information may be determined based on a number of antennas of the terminal and/or a communication bandwidth. The terminal may determine whether to reside on the cell in response to receiving the indication information.

In some embodiments, the base station may receive, by using a random access message in the random access procedure, the terminal capability information sent by the terminal to the base station. The random access message may include at least one of: Msg1, Msg3, or Msg5. The terminal may send the terminal capability information for indicating all terminal capabilities to the base station by using one random access message, for example, the terminal sends the terminal capability information for indicating all the terminal capabilities to the base station by using the Msg1. The terminal may further send the terminal capability information for indicating all the terminal capabilities to the base station by using a plurality of random access messages. For example, the terminal sends the terminal capability information for indicating a part of terminal capabilities to the base station by using the Msg1, and sends the terminal capability information for indicating the other part of terminal capabilities to the base station by using the Msg3.

In some embodiments, the terminal capability information may be carried in the random access message. In some embodiments, information on the number of antennas and communication bandwidth of the terminal may be directly carried in the random access message. The information on the number of antennas and communication bandwidth may be indicated by a preset field. For example, the preset field may indicate that the number of antennas of the terminal is 2 and the communication bandwidth is 40 MHz. Thus, the base station may determine the terminal capability of the terminal when receiving the random access message and determine whether to allow the terminal to access the network based on the terminal capability.

In some embodiments, the random access message includes the Msg1 and the terminal sends the random access message by using a PRACH resource. The PRACH resource may be a random access preamble and an RO. The terminal determines the PRACH resource based on the terminal type before sending the Msg1. The terminal type may indicate the terminal capability supported by the terminal. When the base station receives the Msg1 sent by using the PRACH resource, the base station may determine the terminal type of the terminal based on the PRACH resource of the Msg1, and determine the terminal capability of the terminal based on the terminal type. For example, when the terminal is a redcap terminal type and the terminal capability is 1 antenna and 20 MHZ, the Msg1 is sent by using the first PRACH resource, and the base station determines that the terminal is the redcap terminal type based on the first PRACH resource when receiving the Msg1, and it is determined that the terminal capability supports the 1 antenna and the 20 MHz.

In some embodiments, the PRACH resource includes at least one of: a random access preamble or an RO.

In some embodiments, the terminal type includes a redcap terminal type.

In some embodiments, the terminal capability information indicates at least one predetermined minimum terminal capability set and the minimum terminal capability set includes at least one first terminal capability parameter. The terminal and the base station may acquire the at least one first terminal capability parameter included in the minimum terminal capability set in advance.

In some embodiments, the first terminal capability parameter includes at least one of: a number of antennas or a bandwidth.

In some embodiments, when the terminal sends the terminal capability information for indicating the minimum terminal capability set by using the Msg1, the terminal may further send more terminal capability information by using the Msg2 and the Msg3. The first terminal capability parameter included in the minimum terminal capability set includes a first number of antennas and a first bandwidth. The first number of antennas is 1 and the first bandwidth is 20 MHz. The terminal may further send a second number of antennas and a second bandwidth by using the Msg5. The first number of antennas is 2 and the second bandwidth is 40 MHz. Correspondingly, when the base station receives the terminal capability information for indicating the minimum terminal capability sent by using the Msg1, the base station may further receive more terminal capability information by using the Msg2 and the Msg3.

In some embodiments, when the first terminal capability information has been sent based on the random access message, the terminal capability information sent to the base station by using the terminal capability report message may not include the first terminal capability information. The terminal capability information sent to the base station by using the terminal capability report message may be second terminal capability information other than the first terminal capability information.

In some embodiments, after receiving the terminal capability information sent by the terminal, the base station may send the terminal capability information to the core network device.

In some embodiments, the terminal capability information received by using the random access message may be independently sent to the core network device via a message.

In some embodiments, a second terminal capability report message for indicating the terminal capability information is sent to the core network device. The second terminal capability report message is a new message for transmitting data between the base station and the core network device.

In some embodiments, an initial terminal message for indicating the terminal capability information is sent to the core network device.

In other embodiments, the terminal capability information received by using the random access message and the terminal capability information received by using the first terminal capability message may be commonly sent to the core network device via a message.

It should be noted that those skilled in the art may understand that the methods provided in the embodiments of the disclosure may be executed alone or may be executed together with some methods in the embodiments of the disclosure or some methods in the related art.

As illustrated in FIG. 14, a method for reporting terminal capability information is provided in some embodiments and performed by a core network device. The method includes the following step.

At step 14, a second terminal capability report message for indicating the terminal capability information, sent by the base station, is received;

or, an initial terminal message for indicating the terminal capability information, sent by the base station, is received.

In some embodiments, the terminal capability information indicated by the second terminal capability report message and the initial terminal message is the terminal capability information received based on the random access message. The terminal capability information may be acquired from the random access message.

It should be noted that, the second the terminal capability report message and the initial terminal message may carry the terminal capability information received by using the first terminal capability report message. It may be correspondingly processed based on predetermined rule information.

It should be noted that those skilled in the art may understand that the methods provided in the embodiments of the disclosure may be executed alone or may be executed together with some methods in the embodiments of the disclosure or some methods in the related art.

As illustrated in FIG. 15, a method for reporting terminal capability information is provided in some embodiments and performed by a core network device. The method includes the following step.

At step 15, a third terminal capability report message sent by the base station based on a first terminal capability report message is received.

The third terminal capability report message includes a first field and a second field, the first field is configured to indicate the terminal capability information reported based on the first terminal capability report message, and the second field is configured to indicate the terminal capability information reported based on a random access message.

In some embodiments, the first terminal capability parameter and/or the second terminal capability parameter includes at least one of: a number of antennas or a bandwidth.

For example, the minimum terminal capability set indicates that the number of antennas is 1 and the communication bandwidth is 20 MHz; and a value of the second terminal capability parameter may indicate that the number of antennas is 2 and the communication bandwidth is 40 MHz.

Since the first terminal capability report message follows sending the terminal capability information for indicating the minimum terminal capability set by using the random access message, it's not necessary to send the terminal capability information for indicating the minimum terminal capability set by using an additional terminal capability report message, which may save a signaling overhead.

In some embodiments, the terminal capability information indicated by the first field is reported based on the first terminal capability report message and the terminal capability information indicated by the second field is reported based on the random access message. Thus, two types of terminal capability information may be reported simultaneously based on the third terminal capability report message, which may reduce a signaling overhead.

In some embodiments, the third terminal capability report message includes one of: a UERadioAccessCapabilityInformation inter-node message or a UE RadioPagingInformation message.

In some embodiments, the third terminal capability report message is a UE RadioPagingInformation message; and the first field is a ue-RadioPagingInfo field.

It should be noted that those skilled in the art may understand that the methods provided in the embodiments of the disclosure may be executed alone or may be executed together with some methods in the embodiments of the disclosure or some methods in the related art.

In some embodiments, the ue-RadioPagingInfo field in the UE RadioPagingInformation message carries the terminal capability information reported by the terminal based on the first terminal capability report message;

and/or, a second field in the UE RadioPagingInformation message carries the terminal capability information reported by the terminal based on the random access message.

It should be noted that those skilled in the art may understand that the methods provided in the embodiments of the disclosure may be executed alone or may be executed together with some methods in the embodiments of the disclosure or some methods in the related art.

Figure 16:
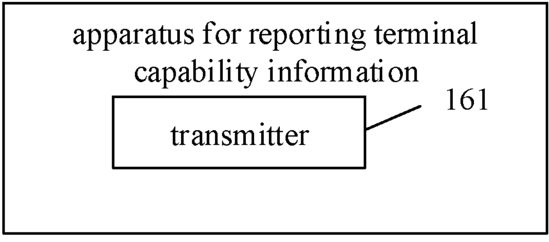
FIG. 16 is a diagram illustrating an apparatus for reporting terminal capability information, implemented in a terminal, according to some embodiments.

As illustrated in FIG. 16, an apparatus for reporting terminal capability information is provided in embodiments of the disclosure. The apparatus includes a transmitter 161.

The transmitter 161 is configured to:

send the terminal capability information to a base station in a random access procedure.

The terminal capability information is configured to indicate a terminal capability supported by the apparatus.

It should be noted that those skilled in the art may understand that the methods provided in the embodiments of the disclosure may be executed alone or may be executed together with some methods in the embodiments of the disclosure or some methods in the related art.

Figure 17:
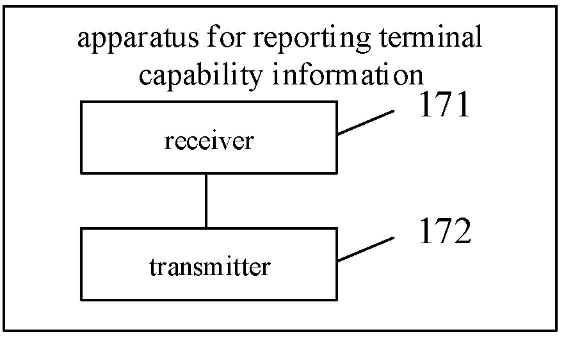
FIG. 17 is a diagram illustrating an apparatus for reporting terminal capability information, implemented in a base station, according to some embodiments.

As illustrated in FIG. 17, an apparatus for reporting terminal capability information is provided in embodiments of the disclosure. The apparatus includes a receiver 171 and a transmitter 172.

The receiver 171 is configured to receive the terminal capability information sent by a terminal in a random access procedure. The terminal capability information is configured to indicate a terminal capability supported by the terminal.

The transmitter 172 is configured to send the terminal capability information to a core network device.

It should be noted that those skilled in the art may understand that the methods provided in the embodiments of the disclosure may be executed alone or may be executed together with some methods in the embodiments of the disclosure or some methods in the related art.

Figure 18:
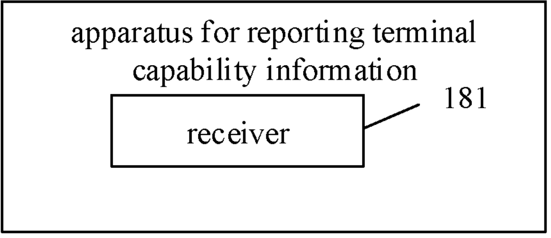
FIG. 18 is a diagram illustrating an apparatus for reporting terminal capability information, implemented in a core network device, according to some embodiments.

As illustrated in FIG. 18, an apparatus for reporting terminal capability information is provided in embodiments of the disclosure. The apparatus includes a receiver 181.

The receiver 181 is configured to receive the terminal capability information sent by a base station. The terminal capability information is configured to indicate a terminal capability supported by a terminal. The terminal capability information is information acquired in a random access procedure.

It should be noted that those skilled in the art may understand that the methods provided in the embodiments of the disclosure may be executed alone or may be executed together with some methods in the embodiments of the disclosure or some methods in the related art.

A communication device is provided in embodiments of the disclosure and includes: a processor; and

- a memory for storing instructions executable by the processor.

The processor is configured to: implement the method described in the above any embodiment when executing the executable instructions.

The processor may include various types of storage media, which are non-transitory computer storage media that may continue to memorize and store information on the communication device after the power is turned off.

The processor may be connected to the memory through a bus or the like, and is used to read the executable program stored on the memory.

A computer storage medium stored with a computer executable program is further provided in embodiments of the disclosure. When the executable program is executed by a processor, the method as described in the above any embodiment is implemented.

Regarding the devices/apparatuses in the above-mentioned embodiments, the specific manner in which each module performs an operation has been described in detail in the method embodiments and will not be described in detail herein.

Figure 19:
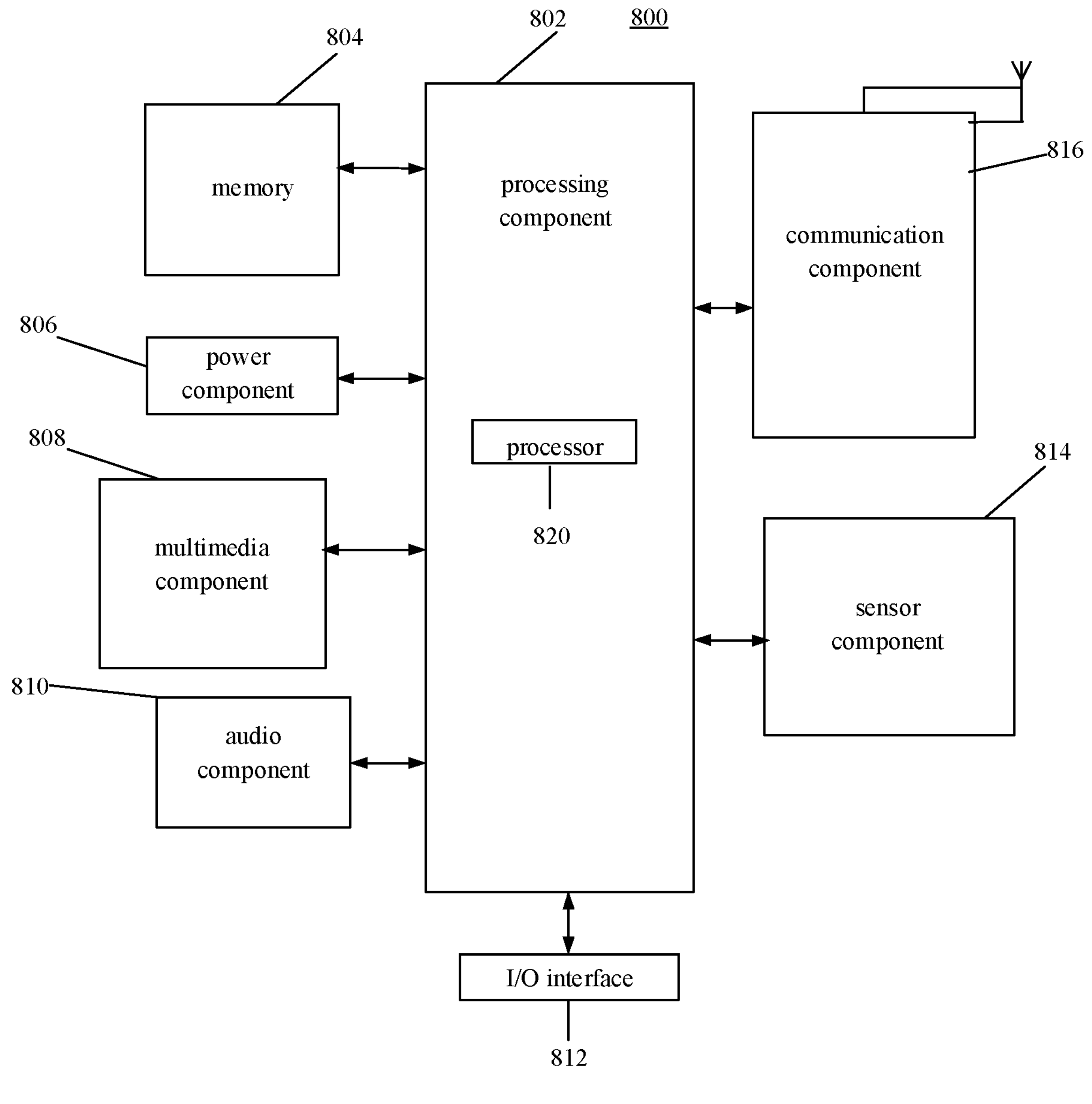
FIG. 19 is a diagram illustrating a structure of a terminal according to some embodiments.

As illustrated in FIG. 19, a structure of a terminal is provided according to some embodiments of the disclosure.

Referring to a device 800 in FIG. 19, some embodiments provide device 800, which may be a mobile phone, a computer, a digital broadcast terminal, a messaging device, a gaming console, a tablet, a medical device, exercise equipment, a personal digital assistant, and the like.

Referring to FIG. 19, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 may access a wireless network based on a communication standard, such as WiFi, 2G, or 3G, or a combination thereof. In one some embodiment, the communication component 816 receives a broadcast signal or broadcast associated information from an external broadcast management system via a broadcast channel. In one some embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer readable storage medium including instructions, such as included in the memory 804, executable by the processor 820 in the device 800, for performing the above-described methods. For example, the non-transitory computer-readable storage medium may be a ROM, a RAM, a CD-ROM, a magnetic tape, a floppy disc, an optical data storage device, and the like.

As illustrated in FIG. 20, some embodiments of the disclosure show a structure of a base station. For example, the base station 900 may be provided as a network-side device. Referring to FIG. 20, the base station 900 includes a processing component 922, which further includes one or more processors, and a memory resource, represented by a memory 932, for storing instructions executable by the processing component 922, such as applications. An application stored in the memory 932 may include one or more modules, each corresponding to a set of instructions. Furthermore, the processing component 922 is configured to execute instructions to perform the above-described methods applied to the base station.

The base station 900 may also include a power supply 926 configured to perform power management of the base station 900, a wired or wireless network interface 980 configured to connect the base station 900 to a network, and an input output (I/O) interface 958. The base station 900 may operate based on an operating system stored in the memory 932, such as Windows Server™, Mac OS X™, Unix™, Linux™, FreeBSD™ or the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for reporting terminal capability information, performed by a terminal, comprising:

sending the terminal capability information to a base station in a random access procedure;

wherein the terminal capability information is configured to indicate a terminal capability supported by the terminal; the terminal capability information is configured to indicate at least one predetermined minimum terminal capability set and the minimum terminal capability set comprises at least one first terminal capability parameter; the first terminal capability parameter is indicated at least by a number of antennas or a communication bandwidth; the first terminal capability parameter is sent by the base station to a core network device via an initial terminal message;

determining that the terminal capability information has been sent based on a random access message and a radio resource control (RRC) connection has been established; and sending a second terminal capability parameter to the base station, wherein the second terminal capability parameter is a terminal capability parameter other than the first terminal capability parameter indicated by the minimum terminal capability set.

2. The method according to claim 1, wherein sending the terminal capability information to the base station comprises:

sending a random access message for indicating the terminal capability information to the base station.

3. The method according to claim 2, wherein the random access message comprises at least one of:

a random access message 1 (Msg1);

a random access message 3 (Msg3); or a random access message 5 (Msg5).

4. The method according to claim 3, wherein the random access message comprises the Msg 1; and sending the random access message for indicating the terminal capability information to the base station comprises:

sending the random access message to the base station based on a physical random access channel (PRACH) resource;

wherein the PRACH resource is determined according to a terminal type of the terminal and the terminal type is configured to indicate the terminal capability supported by the terminal.

5. The method according to claim 4, wherein the PRACH resource comprises at least one of: a random access preamble or a random access channel opportunity (RO).

6. The method according to claim 1, further comprising:

receiving indication information sent by the base station, wherein the indication information is configured to indicate that the base station has acquired the terminal capability information.

7. A method for reporting terminal capability information, performed by a base station, comprising:

receiving the terminal capability information sent by a terminal in a random access procedure, wherein the terminal capability information is configured to indicate a terminal capability supported by the terminal; the terminal capability information is configured to indicate at least one predetermined minimum terminal capability set and the minimum terminal capability set comprises at least one first terminal capability parameter; the first terminal capability parameter is indicated at least by a number of antennas or a communication bandwidth;

sending an initial terminal message to a core network device, wherein the initial terminal message indicates the first terminal capability parameter; and receiving a second terminal capability parameter sent by the terminal, wherein the second terminal capability parameter is sent in a case that the terminal determines that the terminal capability information has been sent based on a random access message and a radio resource control (RRC) connection has been established; the second terminal capability parameter is a terminal capability parameter other than the first terminal capability parameter indicated by the minimum terminal capability set.

8. The method according to claim 7, wherein receiving the terminal capability information sent by the terminal comprises:

receiving, a random access message for indicating the terminal capability information, sent by the terminal.

9. The method according to claim 8, wherein the random access message comprises at least one of:

a random access message 1 (Msg1);

a random access message 3 (Msg3); or a random access message 5 (Msg5).

10. The method according to claim 9, wherein the random access message comprises the Msg 1; and receiving, the random access message for indicating the terminal capability information, sent by the terminal, comprises:

receiving the random access message sent by the terminal based on a physical random access channel (PRACH) resource;

wherein the PRACH resource is determined according to a terminal type of the terminal and the terminal type is configured to indicate the terminal capability supported by the terminal.

11. The method according to claim 7, further comprising:

determining that the terminal capability information has been acquired based on a random access message; and sending indication information to the terminal, wherein the indication information is configured to indicate that the base station has acquired the terminal capability information.

12. The method according to claim 7, further comprising:

receiving a first terminal capability report message sent by the terminal;

wherein the first terminal capability report message carries the second terminal capability parameter;

wherein sending the terminal capability information to the core network device comprises:

sending a third terminal capability report message based on the first terminal capability report message to the core network device;

wherein the third terminal capability report message comprises a first field and a second field, the first field is configured to indicate the terminal capability information reported based on the first terminal capability report message, and the second field is configured to indicate the terminal capability information reported based on a random access message;

wherein the third terminal capability report message comprises one of: a terminal radio access capability information inter-node message or a terminal radio paging information message.

13. A method for reporting terminal capability information, performed by a core network device, comprising:

receiving the terminal capability information sent by a base station;

wherein the terminal capability information is configured to indicate a terminal capability supported by a terminal and the terminal capability information is information acquired in a random access procedure; the terminal capability information is configured to indicate at least one predetermined minimum terminal capability set and the minimum terminal capability set comprises at least one first terminal capability parameter; the first terminal capability parameter is indicated at least by a number of antennas or a communication bandwidth; the minimum terminal capability set also comprises a second terminal capability parameter, and the second terminal capability parameter is a terminal capability parameter other than the first terminal capability parameter indicated by the minimum terminal capability set; the second terminal capability parameter is sent in a case that the terminal determines that the terminal capability information has been sent based on a random access message and a radio resource control (RRC) connection has been established; and receiving an initial terminal message sent by the base station, wherein the initial terminal message indicates the first terminal capability parameter.

14. The method according to claim 13, wherein receiving the terminal capability information sent by the base station comprises:

receiving a third terminal capability report message sent by the base station based on a first terminal capability report message;

wherein the third terminal capability report message comprises a first field and a second field, the first field is configured to indicate the terminal capability information reported based on the first terminal capability report message, and the second field is configured to indicate the terminal capability information reported based on a random access message.

15. A communication device, comprising:

a processor; and a memory for storing machine-readable instructions that, when executed by the processor, cause the processor to execute the method of claim 1.

16. A communication device, comprising:

a processor; and a memory for storing machine-readable instructions that, when executed by the processor, cause the processor to execute the method of claim 7.

* * * * *